United States Patent [19]

Spies et al.

[11] Patent Number: 5,120,132
[45] Date of Patent: Jun. 9, 1992

[54] POSITION MEASURING APPARATUS UTILIZING TWO-BEAM INTERFERENCES TO CREATE PHASE DISPLACED SIGNALS

[75] Inventors: Alfons Spies, Seebruck; Arnold Teimel, Waging am See, both of Fed. Rep. of Germany

[73] Assignee: Dr. Johannes Heidenhaim GmbH, Traunreut, Fed. Rep. of Germany

[21] Appl. No.: 607,997

[22] Filed: Nov. 1, 1990

[30] Foreign Application Priority Data

Nov. 2, 1989 [EP] European Pat. Off. .......... 89120259

[51] Int. Cl.⁵ .................................. G01B 9/02
[52] U.S. Cl. .................. 356/356; 250/237 G
[58] Field of Search ............ 356/356, 354, 363, 374; 250/237 G, 231.13

[56] References Cited

U.S. PATENT DOCUMENTS

| | | |
|---|---|---|
| 3,726,595 | 4/1973 | Matsumoto ..................... 356/356 |
| 3,738,753 | 6/1973 | Huntley, Jr. .................. 250/237 G |
| 4,629,886 | 12/1986 | Akiyama et al. ............. 250/237 G |
| 4,776,701 | 10/1988 | Pettigrew ......................... 356/356 |
| 4,792,678 | 12/1988 | Spies .............................. 250/237 G |
| 4,970,388 | 11/1990 | Nishimura et al. ........... 250/237 G |

FOREIGN PATENT DOCUMENTS

| | | |
|---|---|---|
| 163362B1 | 2/1985 | European Pat. Off. . |
| 0262349A2 | 8/1987 | European Pat. Off. . |
| 0330810A1 | 1/1989 | European Pat. Off. . |
| 3633574A1 | 10/1986 | Fed. Rep. of Germany . |
| 3700906A1 | 1/1987 | Fed. Rep. of Germany . |
| 2185314A | 7/1987 | United Kingdom . |

OTHER PUBLICATIONS

Design Engineering, Feb. 1989, "Linear Encoder Matches Resolution of Laser Interferometer", pp. 14–15.
Philips Technisch Tijdschrift, 1989, "Nauwkeurige Digitale Verplaatsingsmetingen Met Optische Middelen", pp. 153–164.
Dissertation "Hock", 1975 pp. 130–131.

Primary Examiner—Vincent P. McGraw
Assistant Examiner—Richard E. Kurtz, II
Attorney, Agent, or Firm—Willian Brinks Olds Hofer Gilson & Lione

[57] ABSTRACT

A phase grating is provided in this length or angle measuring apparatus, which operates by interference. A beam striking the phase grating from a laser is diffracted into ±1st order beams at the phase grating. The diffracted ±1st order beams are reflected at retroreflecting elements and, diffracted once again at the phase grating, and made to interfere in pairs. The modulations in intensity of the two-beam interferences are converted by detectors into electrical signals that are phase-displaced from one another. The diffraction grating is configured such that at least one partial beam cluster of the zero order of diffraction is involved in the formation of at least one of the two-beam interferences.

14 Claims, 6 Drawing Sheets

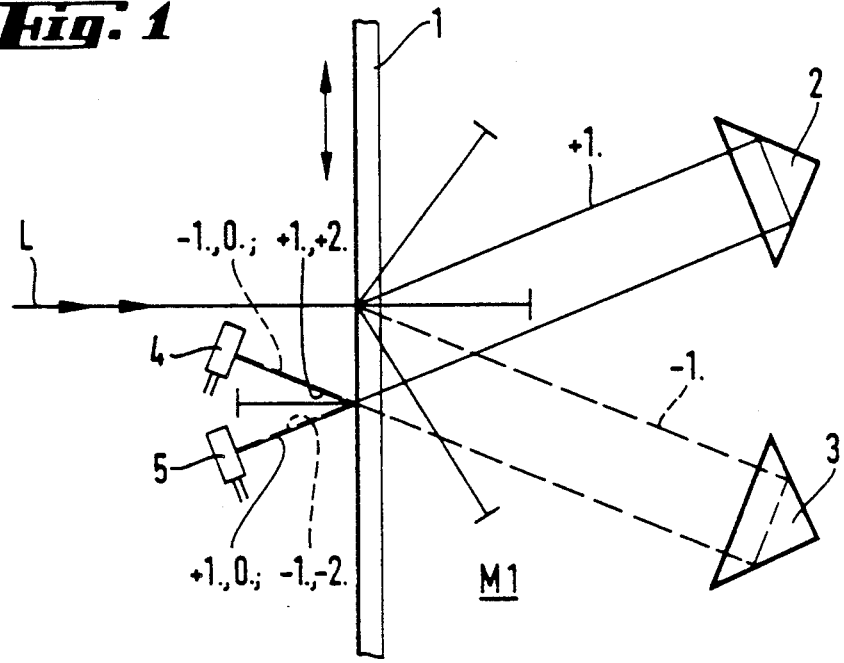
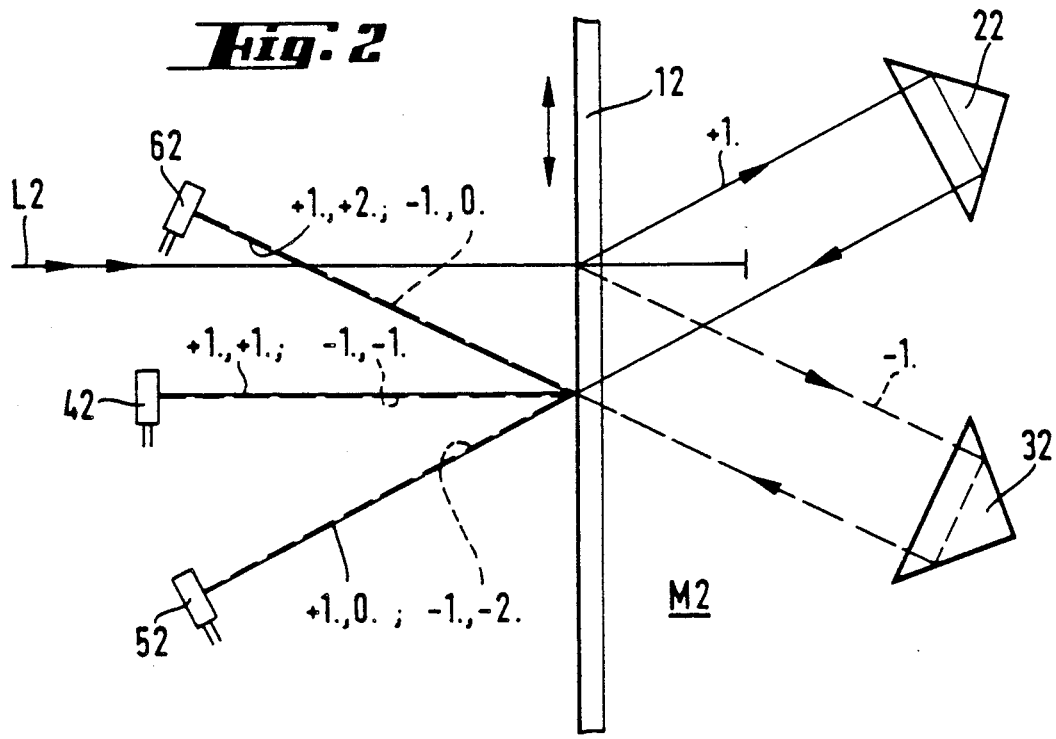

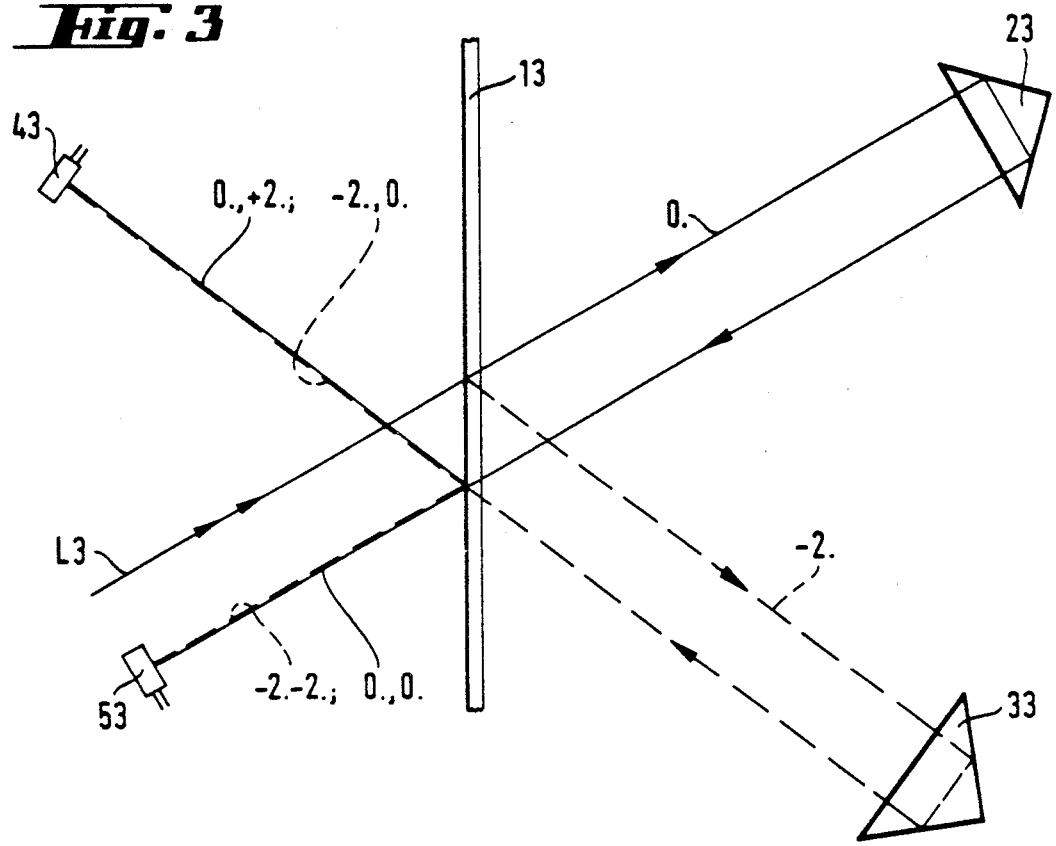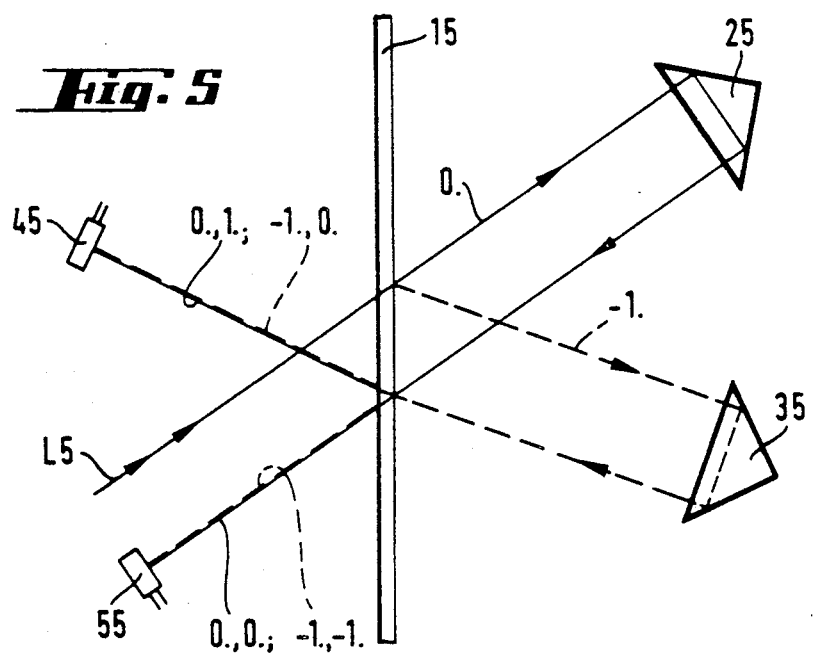

POSITION MEASURING APPARATUS UTILIZING TWO-BEAM INTERFERENCES TO CREATE PHASE DISPLACED SIGNALS

FIELD OF THE INVENTION

The invention relates generally to an apparatus for measuring the relative position of two objects and more specifically to an apparatus for measuring the relative position of the objects of the type having at least one illumination device and at least one detector device associated with one of the objects, and at least one measuring graduation, embodied as a diffraction grating, on the other object, wherein a beam cluster is diffracted at the measuring graduation and split into partial beam clusters capable of interfering with one another.

BACKGROUND OF THE INVENTION

Many different types of position measuring apparatus are presently known in the art. For example, European Patent Document B1 163362, describes one type of position measuring device in which an apparatus operates by the so-called three-grating measurement principle. The disclosed apparatus has a scale grating which is reflective, and a reference grating with selected characteristics that influence the phase relationship of the various orders of diffraction with respect to one another.

In the dissertation entitled "Photoelektrische Messung der Änderung von Längen-oder Winkelpositionen mit Hilfe von Beugungsgittern" [Photoelectric Measurement of the Variation of Longitudinal or Angular Positions With the Aid of Diffraction Gratings] by F. Hock, University of Stuttgart 1975, the back-mixing of two coherent partial beams on a laminar phase grating is shown (FIG. 55) and described on pages 130 and 131. The measuring grating is not shown, however. The phase grating is embodied such that the zero and even-numbered orders of diffraction are eliminated.

Some devices use polarizer and ¼ wave plates to create phase displacements of 90° in the detected signals. German Patent Disclosure Document DE-OS 37 00 906 shows a position measuring apparatus operating by interference, in which the phase displacement of the measurement signals are generated by polarization optical elements, which are located in the beam path of the partial beam cluster.

U.K. Patent Application GB 2 185314A discloses a linear and rotary encoder measuring arrangement where the beams incident on the light receiving elements are 90° out of phase with respect to each other through a combination of quarter-wave plates and polarizing plates.

U.S. Pat. No. 4,629,886 discloses an optical scale reader that brings light beams 90° out of phase with each other without the use of polarizers or ¼ wave plates. Specifically, a half mirror made of plate glass and a semitransparent layer of metal deposited on one surface is used. The diffracted beams are brought into interference and the phase difference of the beams detected from the mirror is determined by the angle of incidence and the angle of the planes of polarization of the incident light beams.

SUMMARY OF THE INVENTION

By comparison, the object of the invention is to devise an apparatus that is simple in design and that furnishes at least two signals that are phase-displaced from one another without using polarization optical means.

This object is attained by an apparatus in which the physical properties of the measuring graduation, embodied as a phase grating, are selected such that at least one partial beam cluster of the zero order of diffraction is involved in the formation of at least one of the two-beam interferences, and the modulations that occur in the two-beam interferences when there is motion of the measuring graduation in the measuring direction are phase-displaced relative to one another.

The advantages of the invention are that only one diffraction grating is needed and the measuring arrangement works without using polarization optical components which greatly simplifies the design and has cost advantages. In addition, scanning signals have a period that is one-fourth the period of the scale.

Further advantages will become apparent from the detailed description and the accompanying drawings.

BRIEF DESCRIPTION OF THE DRAWINGS

Further objects and advantages of this invention will become apparent and readily appreciated from the following detailed description of the present invention, taken in conjunction with the accompanying drawings, of which:

FIG. 1 is a schematic of a measuring apparatus detecting two phase-displaced measurement signals according to a first embodiment of the present invention;

FIG. 2 is a schematic of a measuring apparatus of FIG. 1 wherein three phase-displaced measurement signals are detected;

FIG. 3 is a schematic of a measuring apparatus of FIG. 1 using a non-vertically incident illuminating beam;

FIG. 5 is a schematic of the measuring apparatus of FIG. 3 detecting different orders of diffraction;

DESCRIPTION OF THE PREFERRED EMBODIMENTS

Figure 4A:
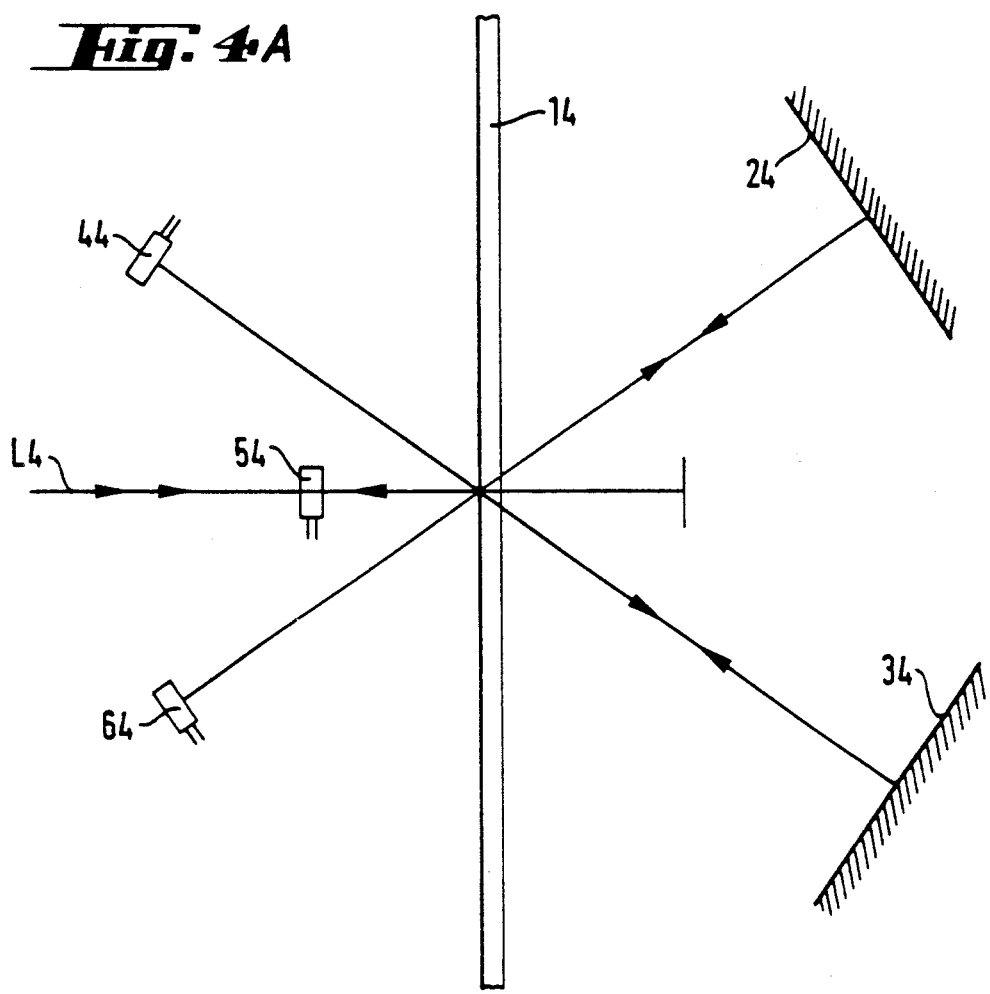
FIG. 4A is a schematic of a measuring apparatus detecting three phase displaced signals according to a second embodiment of the present invention.

The preferred embodiments of the present invention will hereinafter be described in detail with reference to the accompanying drawings.

FIG. 1 illustrates a measuring apparatus M1 according to a first embodiment having a movable diffraction grating 1, two triple mirrors 2 and 3, two detectors 4 and 5, and a light source (not shown). The light source can be a helium-neon gas laser, a semiconductor laser with collimation optics, a light emitting diode with collimation optics, or any other appropriate light source. The beam of light emitted from the light source is directed normally to the plane of the diffraction grating 1. The beam of light is diffracted into ± 1 first order diffraction beams. The zero and higher order beams of diffraction are eliminated from this first diffraction. The ± 1 beam strikes triple mirror 2 and the −1 beam strikes triple mirror 3. The mirrors 2 and 3 are shown as triple mirrors, however, other retroreflecting elements can be used and the present invention is not limited to triple mirrors, but can include triple prisms, cat's eyes and the like. The triple mirrors 2 and 3 redirect the two beams, ± 1, back onto the diffraction grating 1 along a parallel path to the path along which the beams were incident upon the mirrors.

The beams, ± 1, are diffracted a second time by the diffraction grating 1 and certain orders +5 beams are brought into interference with each other. This time the zero order and higher orders of diffraction are used. Specifically, the −1 order beam of the first diffraction and the zero order beam of the second diffraction interfere with the +1 order beam of the first diffraction and the +2 order beam of the second diffraction. This interference beam is detected by a detector 4. A second interference beam is created by the interference of composed of the +1 order beam of the first diffraction and the zero order beam of the second diffraction with the −1 order of the first diffraction and the −2 order of the second diffraction. This interference beam is detected by a detector 5.

The detectors 4 and 5 convert the detected interference beams into electrical signals. Although two detectors are shown, only one detector is needed to perform an interferometric measurement. The electrical signals from detectors 4 and 5 are phased displaced from each other by the inclusion of the zero order beam of diffraction upon the second passage through the diffraction grating 1. This phase displacement indicates the direction of movement of the diffraction grating 1. If the magnitude of movement is solely desired then the zero order beams can be eliminated.

The detectors 4 and 5 detect the intensity of the interference pattern of the two interference beams. The light source, mirrors 2 and 3 and detectors 4 and 5 are all fixed relative to one another and are mounted on a first object such as a machine tool. The diffraction grating 1 is moveable in the direction indicated by the double headed arrow. The diffraction grating 1 can be mounted, for example, on a moveable carriage of the machine tool. When the diffraction grating 1 moves, a relative phase shift is caused between the beams which will result in a shift in the interference pattern. The movement of the grating 1, and therefore a machine tool, is determined by counting the number of fringes moved past a reference point. The number of fringes counted can then be converted into a meaningful unit of measure.

These phase displacements are dependent on the characteristics of the phase grating. A phase displacement can be varied by using a ratio other than 1:1 of the scale lines to gap widths and by varying the index of refraction of the phase layers and/or their thickness.

The basic principle explained in conjunction with FIG. 1 is applicable to all the embodiments that follow, therefore, for the sake of simplicity, only variations appearing in the Figures below will be expanded upon.

FIG. 2 is a schematic of a measuring apparatus M2 wherein three phase displaced signals are detected. All of the elements shown and described with reference to FIG. 1 are included plus a third detector 42. Each detector, 42, 52 and 62, detects a two beam interference. Detector 42 detects the interference of the ± 1 order beams of diffraction with the ± 1 order beams of diffraction. Detector 52 detects the interference of the −1 and −2 order beams of diffraction with the +1 and zero order beams of diffraction. Detector 62 detects the interference of the +1 and +2 order beams of diffraction with the −1 and zero order beams of diffraction. Detectors 52 and 62 detect the same two beam interferences as detectors 4 and 5 of FIG. 1.

The three detectors, 42, 52 and 62 convert the detected interference patterns into electrical signals that are phase displaced by 120°.

It should also be noted in this case that upon the first passage through the phase grating 12, all but the ±1 orders of diffraction are absorbed or faded out, and not until the second passage through the phase grating 12 are the zero and higher orders of diffraction again included in the formation of the interfering partial beam clusters.

FIG. 3 illustrates a measuring apparatus wherein the phase grating 13 is illuminated by a light beam emitted from a light source at some angle other than 90° from the plane of the grating 13. The +1 order beam of diffraction is faded out and the zero and −2 order beams of diffraction are delivered to triple mirrors 23 and 33 respectively. The triple mirrors 23 and 33 are the same as the triple mirrors shown in FIGS. 1 and 2. The triple mirrors 23 and 33 reflect the zero and −2 order beams of diffraction along paths parallel to their entrance to mirrors 23 and 33. The beams are brought into interference at the phase grating 13 where the beams are once again diffracted. The detector 43 detects the interference of the −2 order beam of the first diffraction and the zero order beam of the second diffraction with the zero order beam of the first diffraction and the +2 order beam of the second diffraction. The detector 53 detects the interference between the zero order beam of the first diffraction and the −2 order beam of the second diffraction and the −2 order beam of the first diffraction and the zero order beam of the second diffraction. This arrangement furnishes a signal period that amounts to one-fourth of the grating period.

FIG. 4A is a schematic of a measuring arrangement detecting three phase displaced signals according to a second embodiment of the present invention. The triple mirrors of FIG. 1 are replaced by reflecting mirrors 24 and 34. The zero order beam of first diffraction is eliminated and the +1 and −1 order beams are directed to mirrors 24 and 34 respectively. The mirrors 24 and 34 direct the +1 and −1 beams along their incident paths where they are brought into interference at the phase diffraction grating 14. The detectors 44, 54 and 64 detect the interference between the same beams as the detectors 42, 52 and 62 shown in FIG. 2.

Figure 4B:
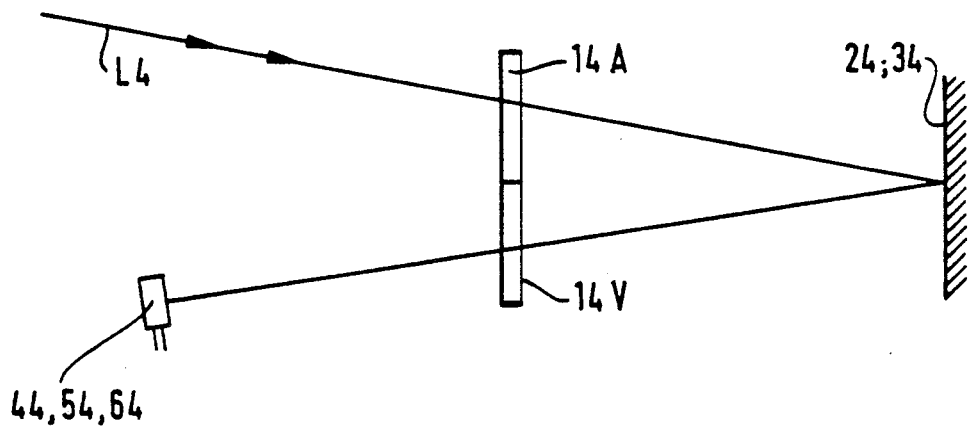
FIG. 4B is a detailed view of the beam path of FIG. 4A.

FIG. 4B is a detailed view of the beam path shown in FIG. 4A wherein the light beam emitted from the light source is not incident normally to the plane of the grating 14. When the light beam strikes the grating 14 at an angle differing from the normal, it is incident upon one section 14A. After the beams are reflected from the mirrors, the beams are incident upon a different portion 14V of the diffraction grating 14.

In this arrangement, the subregions of the phase grating can each be optimized for the splitting of the illuminating beam and the uniting and bringing into interference the diffracted partial beams, in terms of the orders of diffraction to be generated for the partial beam clusters.

FIG. 5 illustrates a variation of FIG. 3 in which the zero and −1 order beams of diffraction are used instead of the zero and −2 order beams. It will be apparent to those skilled in the art from FIGS. 3 and 5 that various orders of diffracted beams can be used while other orders are eliminated. This arrangement furnishes a signal period that amounts to one-half of the grating period.

Figure 6A:
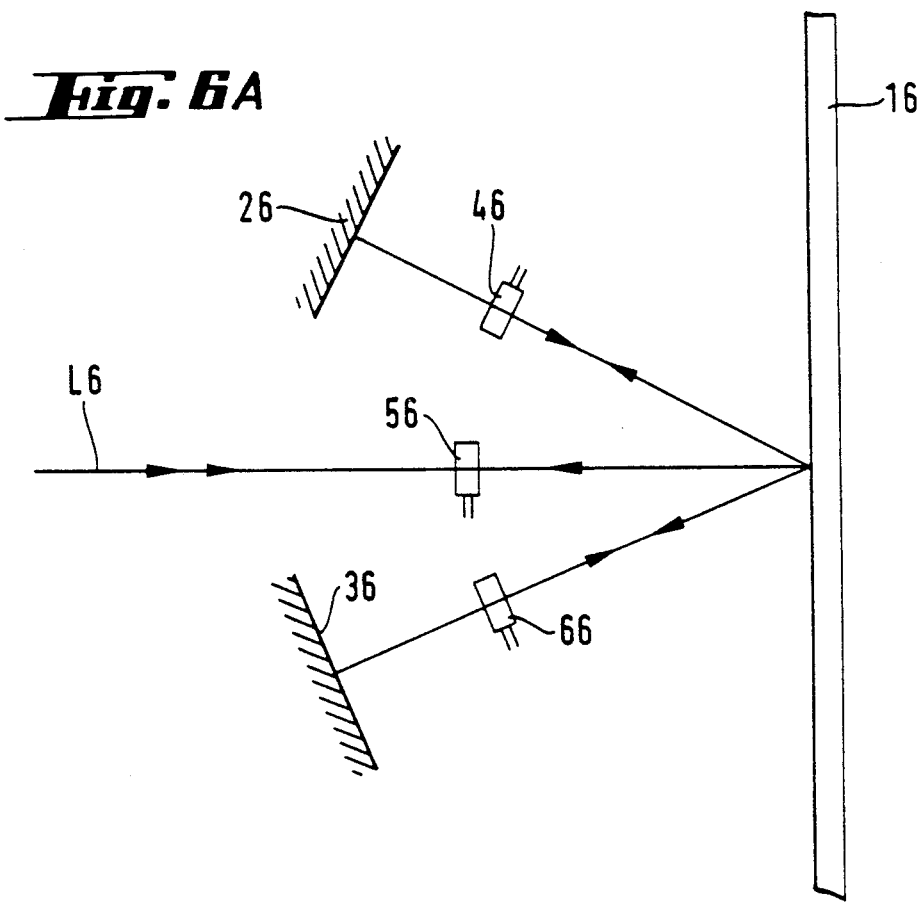
FIG. 6A shows a measuring apparatus according to a third embodiment of the present invention.
Figure 6B:
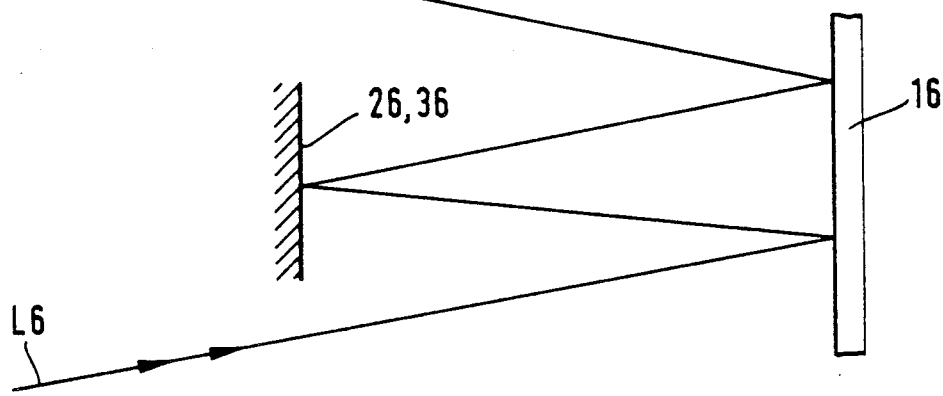
FIG. 6B is a detailed view of the beam path of FIG. 6A.

FIG. 6A shows a measuring apparatus according to a third embodiment of the present invention wherein the reflecting elements 26 and 36 and the detectors 46, 56 and 66 are on the same side of the diffraction grating 16. FIG. 6A is a variation of the measuring arrangement shown in FIG. 4A using the incident light approach. FIG. 6B illustrates how the light beam and the diffracted beams strike different areas of the grating 16 in a way similar to that shown in FIG. 4B. The discussion with respect to those Figures is equally applicable to FIGS. 6A–B.

Figure 7A:
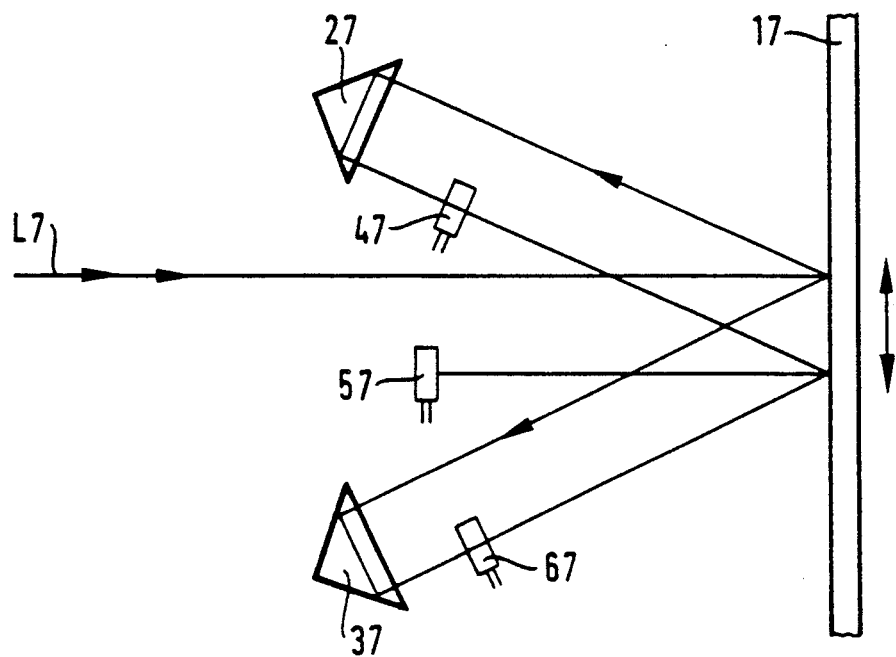
FIG. 7A shows a measuring apparatus according to a fourth embodiment of the present invention.
Figure 7B:
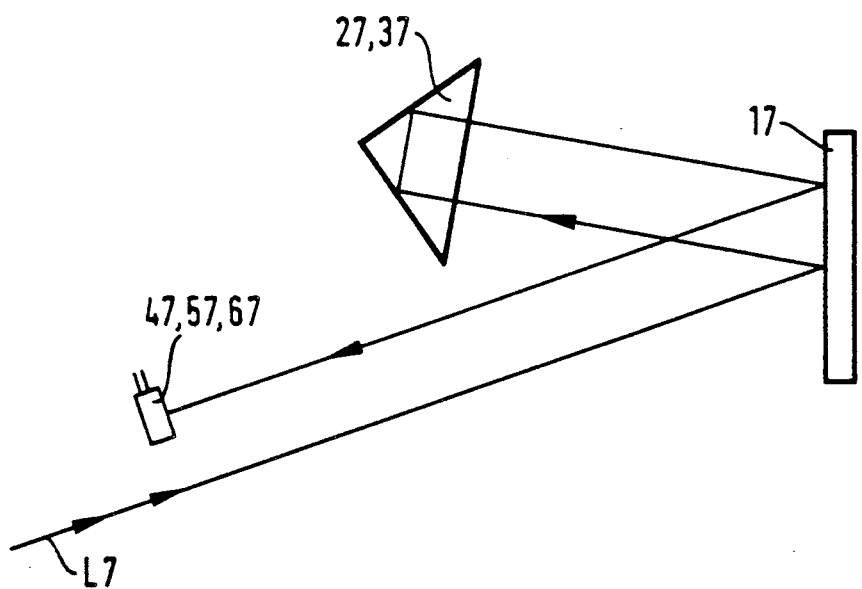
FIG. 7B is a detailed view of the beam path of FIG. 7A.

FIGS. 7A and 7B illustrate a measurement arrangement according to a fourth embodiment of the present invention. The reflecting elements, and the detectors 47, 57 and 67 are on the same side of the diffraction grating 17, 27 and 37. FIG. 7A is a variation of FIG. 6A with triple mirrors comprising the reflecting elements. In addition, the light beams enter and exit the diffraction grating at different points as shown in FIG. 7B. FIG. 7B is a variation of FIG. 6B with a triple mirror comprising the reflecting element.

FIGS. 6–7 are incident light measuring arrangements as opposed to the transmitted light arrangements shown in FIGS. 1–5. Adapting the transmitted light measuring arrangements shown in FIGS. 1–5 to incident light measuring arrangements shown in FIGS. 6–7 is common knowledge to those skilled in the art and no further explanation is necessary.

Figure 8:
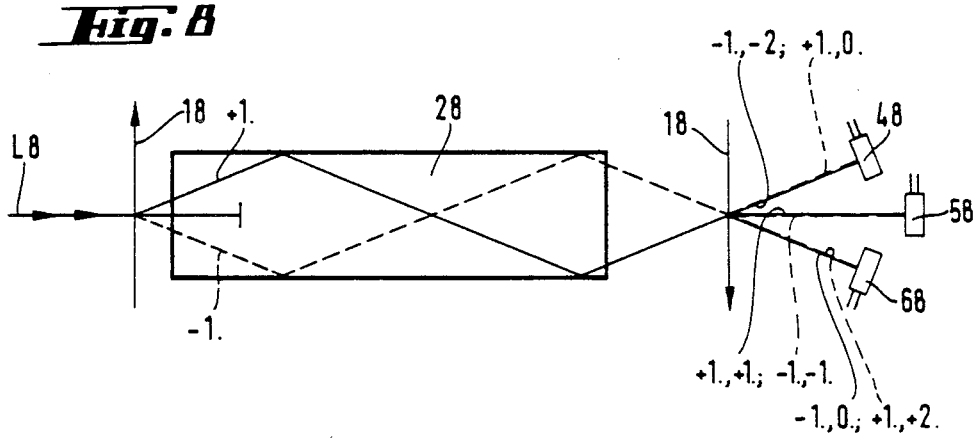
FIG. 8 is an angle measuring apparatus according to a fifth embodiment of the present invention.

FIG. 8 is an angle measuring apparatus according to a fifth embodiment of the present invention. The measuring apparatus uses the principle of diameter scanning as shown in U.S. Pat. No. 4,792,678 which is incorporated herein by reference. A cylinder having a phase grating 18 applied to its interior circumference is used in a known manner. A light beam from a light source (not shown) passes through the phase grating 18 whereupon the light beam is diffracted into partial beam clusters of the ±1 order of diffraction. These partial beams enter a deflection prism 28 and are deflected twice. The beams pass through the cylindrical diffraction grating 18 at a point diametrically opposite to the first diffraction area. The beams converge on the second portion of the diffraction grating 18 at the same angle they emerged after the first diffraction. After the second diffraction, three interference beams are detected by detectors 48, 58 and 68. Specifically, detector 48 detects the interference of the +1 order beam of the first diffraction and the zero order beam of the second diffraction with the −1 order beam of the first diffraction and the −2 order beam of the second diffraction. Detector 68 detects the interference of the −1 order of the first diffraction and the zero order beam of the second diffraction with the +1 order beam of the first diffraction and the +2 order beam of the second diffraction. Finally, detector 58 detects the interference of the ±1 order beams of the first diffraction with the ±1 order beams of the second diffraction. As discussed with all of the previous embodiments, the detectors convert the interference signals into electrical signals that are phase displaced from one another in a known manner.

Figure 9:
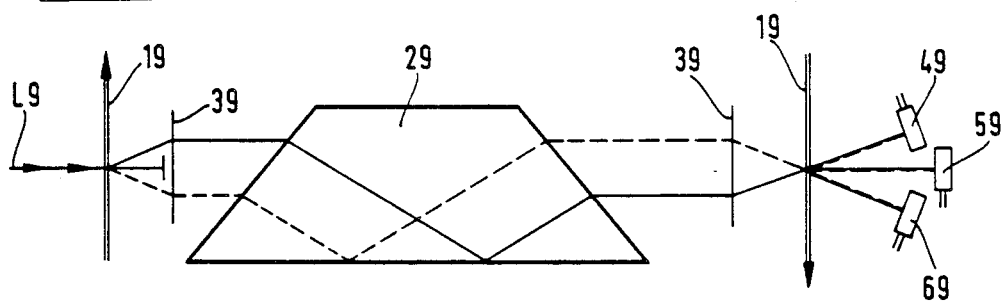
FIG. 9 is an angle measuring apparatus according to a sixth embodiment of the present invention.

FIG. 9 illustrates the measuring arrangement of FIG. 8 wherein the defection prism 28 is replaced by a "dove" prism 29 which is preceded and followed by deflection gratings 39 as is well known in the art. The detectors 49, 59 and 69 detect the same interfering beams as detectors 48, 58 and 68 of FIG. 8.

While this invention has been shown in connection with preferred embodiments, it is apparent that certain changes and modifications, in addition to those mentioned above, may be made from the basic features of the present invention. Accordingly, it is intended that the scope of the invention be defined by the following claims, including all equivalents.

What is claimed is:

1. An apparatus for measuring the relative position of two objects comprising:
    an illumination source;
    a detector attached to one of the two objects;
    a measuring graduation in the form of a diffraction grating attached to the other object wherein a light beam emitted from said source is diffracted into partial beam clusters;
    deflection means for deflecting said partial beam clusters onto said measuring graduation wherein said partial beam clusters are diffracted once again so that a two-beam interference is created; and
    at least one detector for detecting and converting the modulation in the intensity of said two-beam interference into an electrical signal,
    said diffraction grating being configured such that at least one partial beam cluster of the zero order of diffraction is involved at least in the formation of one of the two-beam interferences, and that the modulations that occur in the two-beam interference upon a motion of the measuring graduation in the measuring direction are phase-displaced relative to one another.

2. The apparatus according to claim 1 wherein said deflection means comprises a retroreflecting element.

3. The apparatus according to claim 2 wherein said retroreflecting element comprises a triple prism.

4. The apparatus according to claim 2 wherein said retroreflecting element comprises a triple mirror.

5. The apparatus according to claim 1 wherein said deflection means comprise plane mirrors.

6. The apparatus according to claim 1 wherein said deflection means comprise deflection prisms for an angle encoding apparatus.

7. The apparatus according to claim 1 wherein said deflection means comprise a dove prism, which is preceded and followed by one deflection grating for an angle encoding apparatus.

8. The apparatus according to claim 1 wherein said detector comprises at least two photoelements, and wherein said at least two photoelements are configured such that they convert at least two two-beam interferences into two electrical signals phase-displaced from one another.

9. The apparatus according to claim 1 wherein one single measuring graduation comprises the diffraction grating.

10. The apparatus according to claim 1 wherein the subregions of the phase grating each have different physical properties, for splitting and uniting the beam clusters.

11. The apparatus according to claim 1 wherein the interfering orders of diffraction are selected such that the period of the electrical signals comprises one-fourth the graduation period of the measuring graduation.

12. The apparatus according to claim 8 wherein the interfering orders of diffraction are selected such that the period of the electrical signals comprises one-fourth the graduation period of the measuring graduation.

13. The apparatus according to claim 1 wherein the interfering orders of diffraction are such that the period of the electrical signals comprises one-half the graduation period of the measuring graduation.

14. The apparatus according to claim 8 wherein the interfering orders of diffraction are such that the period of the electrical signals comprises one-half the graduation period of the measuring graduation.

* * * * *